United States Patent
Miyazaki et al.

(10) Patent No.: US 11,120,315 B2
(45) Date of Patent: Sep. 14, 2021

(54) IMAGE PROCESSING APPARATUS, IMAGE PROCESSING METHOD, AND NON-TRANSITORY COMPUTER READABLE STORAGE MEDIUM, WITH IMAGE PROCESSING USING DISTANCE INFORMATION EQUIVALENT TO DISTANCE FROM FOCAL PLANE AT TIME OF IMAGE-CAPTURING AND IMAGE PROCESSING CONDITION

(71) Applicant: CANON KABUSHIKI KAISHA, Tokyo (JP)

(72) Inventors: Shinichi Miyazaki, Kawasaki (JP); Maya Yazawa, Kawasaki (JP); Hidetsugu Kagawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/794,399

(22) Filed: Feb. 19, 2020

(65) Prior Publication Data

US 2020/0272870 A1 Aug. 27, 2020

(30) Foreign Application Priority Data

Feb. 27, 2019 (JP) .............................. JP2019-034737

(51) Int. Cl.
*G06K 15/00* (2006.01)
*G06K 15/02* (2006.01)
*H04N 13/122* (2018.01)

(52) U.S. Cl.
CPC ....... *G06K 15/1872* (2013.01); *H04N 13/122* (2018.05)

(58) Field of Classification Search
None
See application file for complete search history.

(56) References Cited

U.S. PATENT DOCUMENTS

| 9,324,153 | B2 | 4/2016 | Komatsu |
| 10,074,343 | B2* | 9/2018 | Ono .......................... H04N 5/76 |
| 10,972,714 | B2* | 4/2021 | Yanai ................... H04N 13/122 |
| 2011/0096176 | A1* | 4/2011 | Nakami ................. H04N 5/357 |
| | | | 348/207.2 |
| 2013/0300860 | A1 | 11/2013 | Komatsu |

(Continued)

FOREIGN PATENT DOCUMENTS

| JP | 2008-015754 A | 1/2008 |
| JP | 2009-251839 A | 10/2009 |
| JP | 2013-253964 A | 12/2013 |

*Primary Examiner* — Dung D Tran
(74) *Attorney, Agent, or Firm* — Venable LLP

(57) ABSTRACT

Conventionally, three-dimensional appearance of an output image in an output apparatus such as a printer or display differs from that of an input image in that output characteristics of the output apparatus that influences sharpness of an image is not considered. According to an embodiment of this present invention, an image processing apparatus sets an image processing condition for executing image processing, that is set based on output characteristics of an output apparatus and image characteristics related information obtained when image data is obtained, and performs image processing for the image data using information equivalent to a distance from a focal plane at the time of image-capturing an object and the set image processing condition.

21 Claims, 12 Drawing Sheets

(56) References Cited

U.S. PATENT DOCUMENTS

| | | | |
|---|---|---|---|
| 2015/0016679 A1* | 1/2015 | Cao | G06K 9/4604 |
| | | | 382/103 |
| 2016/0057341 A1* | 2/2016 | Nakayama | H04N 5/23229 |
| | | | 348/207.1 |
| 2016/0119606 A1* | 4/2016 | Horikawa | H04N 13/207 |
| | | | 348/46 |
| 2016/0309142 A1* | 10/2016 | Kiyosawa | H04N 13/111 |
| 2019/0130591 A1* | 5/2019 | Tanaka | G06T 7/11 |
| 2019/0253609 A1 | 8/2019 | Miyazaki et al. | |
| 2019/0253689 A1 | 8/2019 | Yanai et al. | |
| 2019/0253690 A1* | 8/2019 | Yanai | H04N 13/139 |
| 2020/0007854 A1 | 1/2020 | Ogawa et al. | |
| 2020/0012908 A1 | 1/2020 | Miyazaki et al. | |
| 2020/0013178 A1 | 1/2020 | Miyazaki et al. | |

* cited by examiner

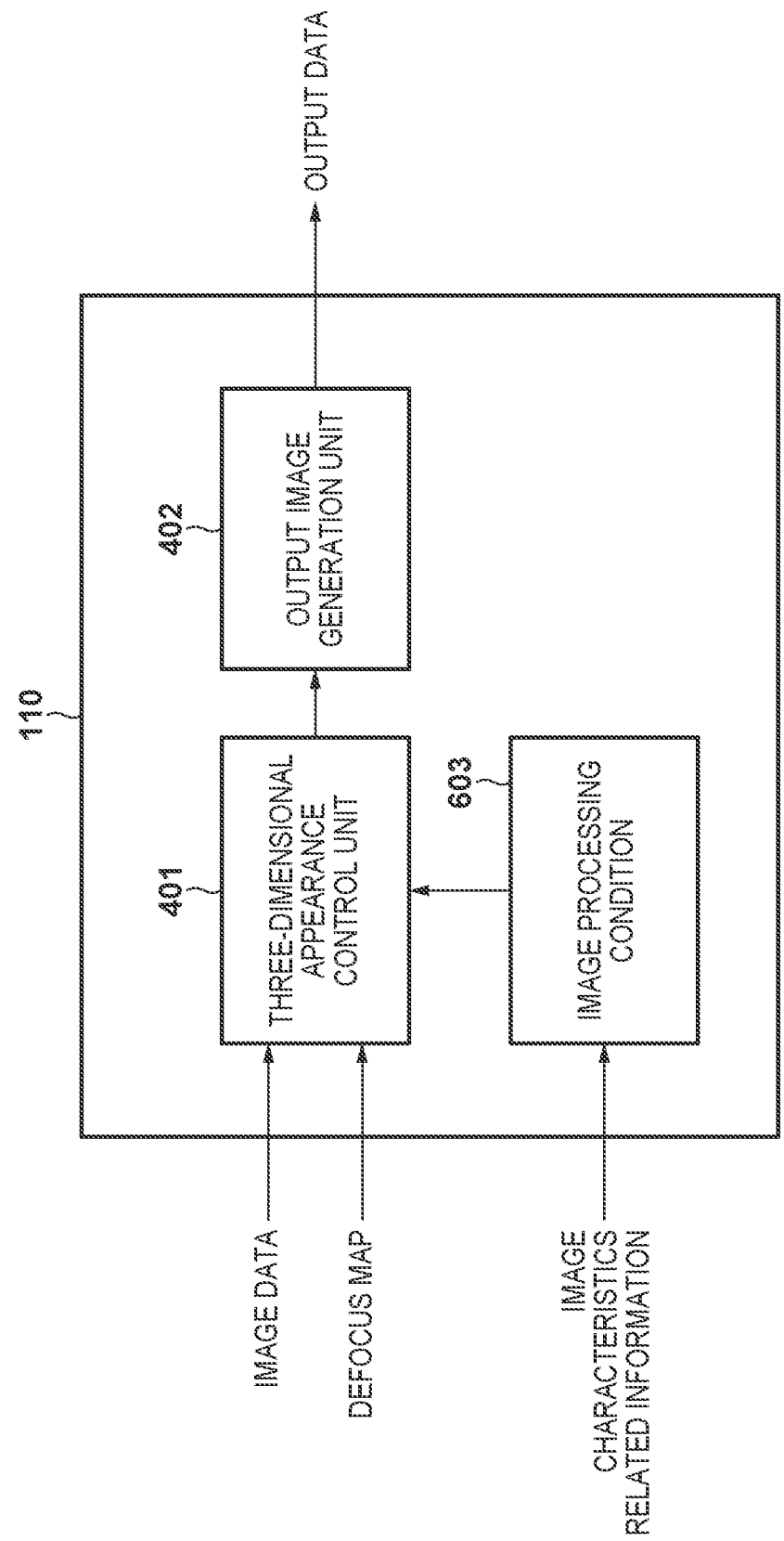

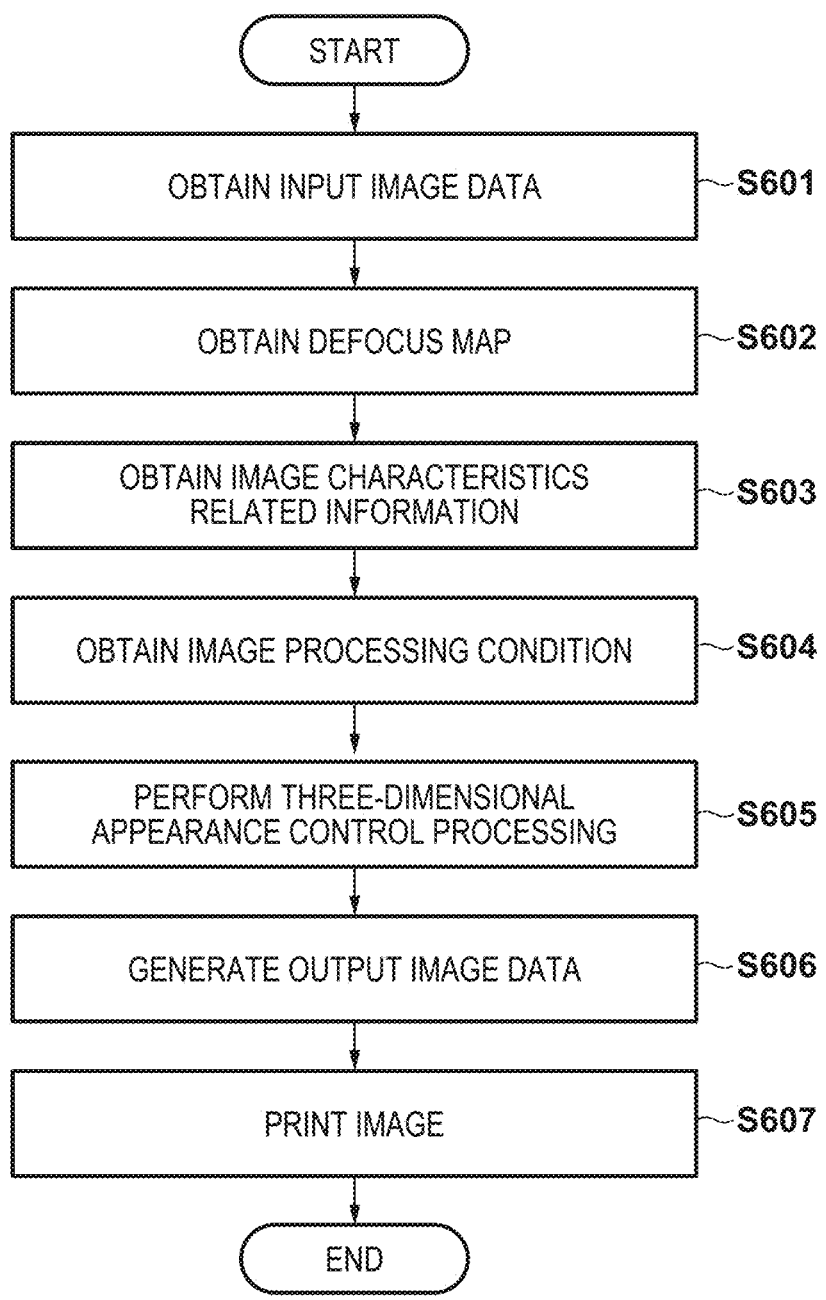

IMAGE PROCESSING APPARATUS, IMAGE PROCESSING METHOD, AND NON-TRANSITORY COMPUTER READABLE STORAGE MEDIUM, WITH IMAGE PROCESSING USING DISTANCE INFORMATION EQUIVALENT TO DISTANCE FROM FOCAL PLANE AT TIME OF IMAGE-CAPTURING AND IMAGE PROCESSING CONDITION

BACKGROUND OF THE INVENTION

Field of the Invention

The present invention relates to an image processing apparatus, an image processing method, and a non-transitory computer readable storage medium, and particularly to an image processing apparatus, an image processing method, and a storage medium for effectively controlling, for example, the three-dimensional appearance of an image output to a printer.

Description of the Related Art

A human three-dimensionally perceives a thing looked at with his/her eyes and is considered to perceive it by his/her brain based on clues from both eyes, clues from a single eye, motion parallax, and the like. The clues from both eyes include retinal parallax that is a difference between retinal images on both eyes. The clues from a single eye include line perspective, the dimensions of an object, the gradient of a texture, shading, perspective, and the effect of blurring. By using one or more of these clues, the human perceives a three-dimensional appearance, that is, the depth, thickness, and height of a "thing" and the anteroposterior relationship of the "thing".

When looking at a two-dimensional image captured by a camera or the like and displayed, projected, or printed, the human perceives the three-dimensional appearance of the image from a difference in blurring between an in-focus portion and a portion that is out of focus depending on the depth. That is, the reproduction of the focused (in-focus) portion and defocused (out-of-focus) portion of the image is important for the three-dimensional appearance.

Methods are being proposed to obtain distance information of a scene including an object generally at the time of shooting, such as a method of measuring an actual distance from a shooting point to a target by a laser distance meter or the like, and a method of measuring a distance from parallax information of two cameras. Japanese Patent Laid-Open No. 2009-251839 has proposed a technique as an image quality improvement method using depth information.

If image data obtained by an image capturing apparatus such as a camera is input to an output apparatus such as a printer, the degree of blurring of an image of the image data changes depending on the characteristics of an image sensing optical system, settings of the image capturing apparatus, image processing based on the settings, and the like. For example, the sharpness of the captured image changes depending on an aperture value and focal length as settings at the time of shooting, and also changes depending on the imaging sensor and the lens of the image capturing apparatus, an optical low-pass filter and an infrared cut filter as optical components between the lens and the imaging sensor, and the like. In either case, the intention of a photographer who has image-captured an object is reflected in various degrees of blurring caused by the above factors. The output apparatus forms an image from the input image data in which the intention of the photographer is reflected, and outputs the image, and one who looks at the image will perceive a three-dimensional appearance from the degree of blurring of the image.

However, in the conventional technique, when an image is output from a printer or the like, the sharpness of the output image degrades owing to degradation of the sharpness of the image by a print medium or ink bleeding, or resolution conversion processing of resizing input image data into a print medium size (print size). The sharpness of a display image similarly degrades even on a display or a projector.

Therefore, when the degree of blurring (sharpness difference) of input image data changes due to the output characteristics of the output apparatus, the original three-dimensional appearance of the input image data in which the intention of the photographer is reflected unwantedly degrades or changes in an image output from the output apparatus.

In Japanese Patent Laid-Open No. 2009-251839, processing is performed to estimate and calculate the depth of an image at each position, associate the depth with an image processing method, effectively select an image processing method for each position appropriately, and increase the resolution while preventing degradation of the three-dimensional appearance. However, depth information used in Japanese Patent Laid-Open No. 2009-251839 is information estimated and calculated from an image itself, so the depth may not be obtained correctly depending on the characteristic or composition of the image. As a result, processing suited to the target image cannot be performed, and the human may feel a sense of discomfort in the three-dimensional appearance of the image.

Furthermore, in Japanese Patent Laid-Open No. 2009-251839, the three-dimensional appearance of an input image is controlled, but the degree of blurring (sharpness difference) of an output of the input image and the characteristics of an output apparatus that influence the sharpness at the time of image reproduction are not considered. Thus, processing suited to an image output from an output apparatus such as a printer or a display cannot be performed for the original three-dimensional appearance of an image, and the three-dimensional appearance may degrade or change.

As described above, the conventional technique does not solve the problem that the three-dimensional appearance of an image felt by a human degrades or changes in a reproduced output image.

SUMMARY OF THE INVENTION

Accordingly, the present invention is conceived as a response to the above-described disadvantages of the conventional art.

For example, an image processing apparatus, an image processing method, and a non-transitory computer readable storage medium according to this invention are capable of performing processing so that the three-dimensional appearance of an image felt by a human can be properly represented even in an output image.

According to one aspect of the present invention, there is provided an image processing apparatus for performing image processing for image data obtained by image-capturing an object and outputting the image data to an output apparatus, comprising: a setting unit configured to set an image processing condition for executing the image processing, that is set based on output characteristics of the output apparatus and image characteristics related information obtained when the image data is obtained; and an image processing unit configured to perform image processing for the image data using information equivalent to a distance from a focal plane at the time of image-capturing the object and the image processing condition set by the setting unit.

According to another aspect of the present invention, there is provided a non-transitory computer readable storage medium storing a program for causing a computer to function as each unit of an image processing apparatus having the above-described arrangement.

According to still another aspect of the present invention, there is provided an image processing method for an image processing apparatus for performing image processing for image data obtained by image-capturing an object and outputting the image data to an output apparatus, comprising: setting an image processing condition for executing the image processing, that is set based on output characteristics of the output apparatus and image characteristics related information obtained when the image data is obtained; and performing image processing for the image data using information equivalent to a distance from a focal plane at the time of image-capturing the object and the set image processing condition.

The invention is particularly advantageous since image processing is performed using an image processing condition that is set based on the output characteristics of the output apparatus and image characteristics related information at the time of obtaining image data, and a three-dimensional appearance can be properly represented even in an output image.

Further features of the present invention will become apparent from the following description of exemplary embodiments (with reference to the attached drawings).

BRIEF DESCRIPTION OF THE DRAWINGS

FIG. 6 is a block diagram showing the arrangement of the image processing unit;

FIG. 7 is a flowchart showing a general description of image processing;

DESCRIPTION OF THE EMBODIMENTS

Figure 1:
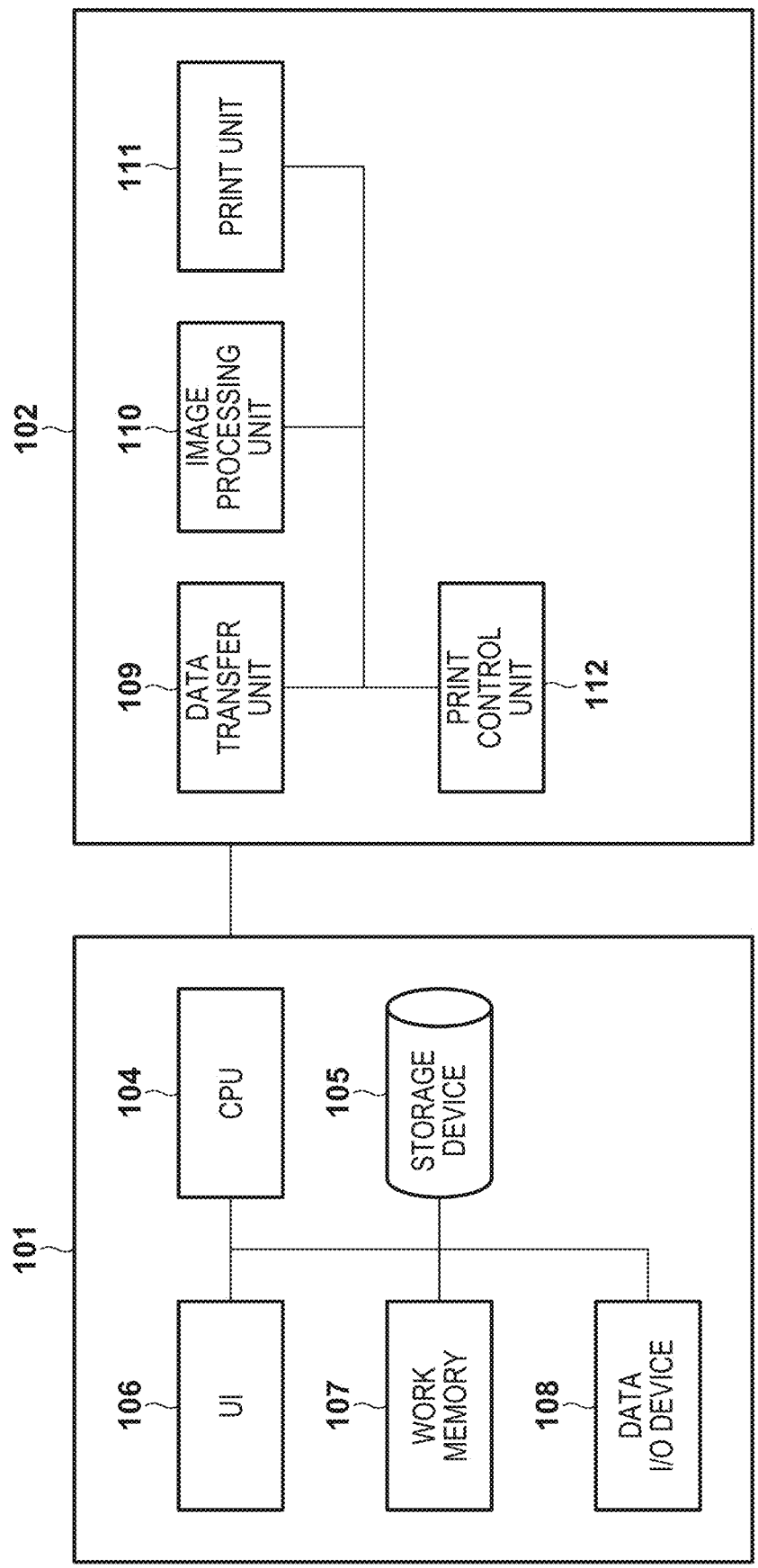
FIG. 1 is a block diagram showing the schematic arrangement of an image processing system according to an exemplary embodiment of the present invention.

Exemplary embodiments of the present invention will now be described in detail in accordance with the accompanying drawings. Note that the following embodiment does not limit the invention according to the scope of the appended claims. Although a plurality of features are described in the embodiment, not all the features are essential to the invention and the plurality of features may arbitrarily be combined. Throughout the accompanying drawings, the same reference numerals denote the same or similar components and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Note that although an inkjet printer will be described as an example of an output apparatus that outputs an image, a laser beam printer adopting an electrophotographic method may be used.

<General Description of Image Processing System (FIGS. 1 to 4B)>

FIG. 1 is a block diagram showing the overall arrangement of an image processing system (to be referred to as a system hereinafter) using an image processing apparatus according to an exemplary embodiment of the present invention. As shown in FIG. 1, the system is constituted by a personal computer apparatus (PC) 101 (to be referred to as a PC hereinafter) and an output apparatus 102. The PC 101 and the output apparatus 102 are connected by a wired/wireless network or an interface such as USB or local bus.

The PC 101 performs, for example, transfer of a print control instruction, necessary information, and image data to the output apparatus 102. A storage device 105 stores an OS, system programs, various applications, and parameter data necessary for various processes. The storage device 105 is constituted by a hard disk (HD), a solid state disk (SSD), and a rewritable storage medium such as a flash ROM. A CPU 104 performs processing using a work memory 107 such as a RAM when performing software stored in the storage device 105. In regard to performing the processing, an operation unit (to be referred to as a UI hereinafter) 106 serving as a user interface includes input devices such as a keyboard and a pointing device, and a display device such as a display in order to perform processing regarding input from the user and display to the user. A data I/O device 108 performs data input/output from/to an external storage medium such as an SD card. An image capturing apparatus (not shown) such as a digital camera may be directly connected to the data I/O device 108 or a data transfer unit 109 to transfer data without mediating an external storage medium.

The output apparatus 102 is constituted by the data transfer unit 109, a print control unit 112, an image processing unit 110 (to be described later), and a print unit 111. The PC 101 transmits print data to the output apparatus 102. The print data includes image data of photographic data obtained by image-capturing an object by the image capturing apparatus. The print data is formed by the image data, information equivalent to a distance from a focal plane at the time of shooting corresponding to the image data, image characteristics related information (to be described later), image processing parameters serving as data unique to a print medium, printer control data, and print information data such as print quality and a print medium selected on the UI. The information (to be described later) equivalent to a distance from the focal plane at the time of shooting includes a defocus amount, an image shift amount, and a distance from an actual focal plane to an object.

Although data generated by the image capturing apparatus such as a digital camera will be explained here, data is not limited to this and may be data generated from information obtained by actually measuring a distance. The data may be, for example, both data generated from the result of analyzing the blurring amount of input image data and other data at the time of shooting. The input image data and the information equivalent to a distance from the focal plane may be generated in the image capturing apparatus or generated in the PC 101 or output apparatus 102 connected to the image capturing apparatus.

Information for generating information equivalent to a distance from the focal plane may be obtained from the image capturing apparatus to generate information equivalent to a distance from the focal plane in the PC 101 or output apparatus 102 connected to the image capturing apparatus. It is also possible to connect the image capturing apparatus to the PC 101, and generate information in the output apparatus 102 that obtains via the PC 101 information for generating information equivalent to a distance from the focal plane. The information for generating information equivalent to a distance from the focal plane is, for example, a pair of images obtained by photoelectrically converting beams having passed through different regions of the exit pupil of an imaging lens.

Note that the image characteristics related information may be information of contrast reproduction characteristics at the time of shooting the image data by the image capturing apparatus, or information for calculating or specifying contrast reproduction characteristics. The information for calculating or specifying the contrast reproduction characteristics may be any information as long as the contrast reproduction characteristics can be calculated or specified. The information may be, for example, information of an image sensing optical system (to be described later) such as the type of lens, information of an optical filter, information of an aperture value, a focal length, and the like, or information indicating image processing performed in the image capturing apparatus (to be described later). The information for calculating or specifying the contrast reproduction characteristics may be formed by one kind of information or a combination of a plurality of kinds of information. In either case, the image characteristics related information is obtained, by the PC 101 or the output apparatus 102 from the image capturing apparatus, as information to be paired with the image data, and contrast reproduction characteristics information is calculated in the apparatus. Alternatively, desired contrast reproduction characteristics information is specified from a plurality of pieces of contrast reproduction characteristics information stored in a storage device (a hard disk, a ROM, or the like) within the apparatus.

The data transfer unit 109 extracts, from print data transmitted from the PC 101, input image data, data equivalent to a distance from the focal plane at the time of shooting, image characteristics related information, and image processing parameters. Then, the data transfer unit 109 transfers these extracted data to the image processing unit 110, and transfers printer control data to the print control unit 112. The input image data is data resized to the size of a user-set print medium by resolution conversion processing stored as a program in the storage device 105 within the PC 101. The resolution conversion processing may be performed similarly in the image processing unit 110 within the output apparatus 102. The image processing unit 110 is incorporated in the output apparatus 102 in this system, but may be incorporated in the PC 101.

The image processing parameters and the print control data are stored in a storage device (not shown) such as the storage device 105 in the PC 101 or the hard disk, ROM, or the like in the output apparatus 102. However, the image processing parameters and the printer control data may be selected based on print information data in print data and transferred to the image processing unit 110 and the print control unit 112. The print control unit 112 controls the operation of the print unit 111 in accordance with the print control data. The print unit 111 is configured to print by discharging ink from a printhead complying with an inkjet method and forming an image on a print medium.

Figure 2:
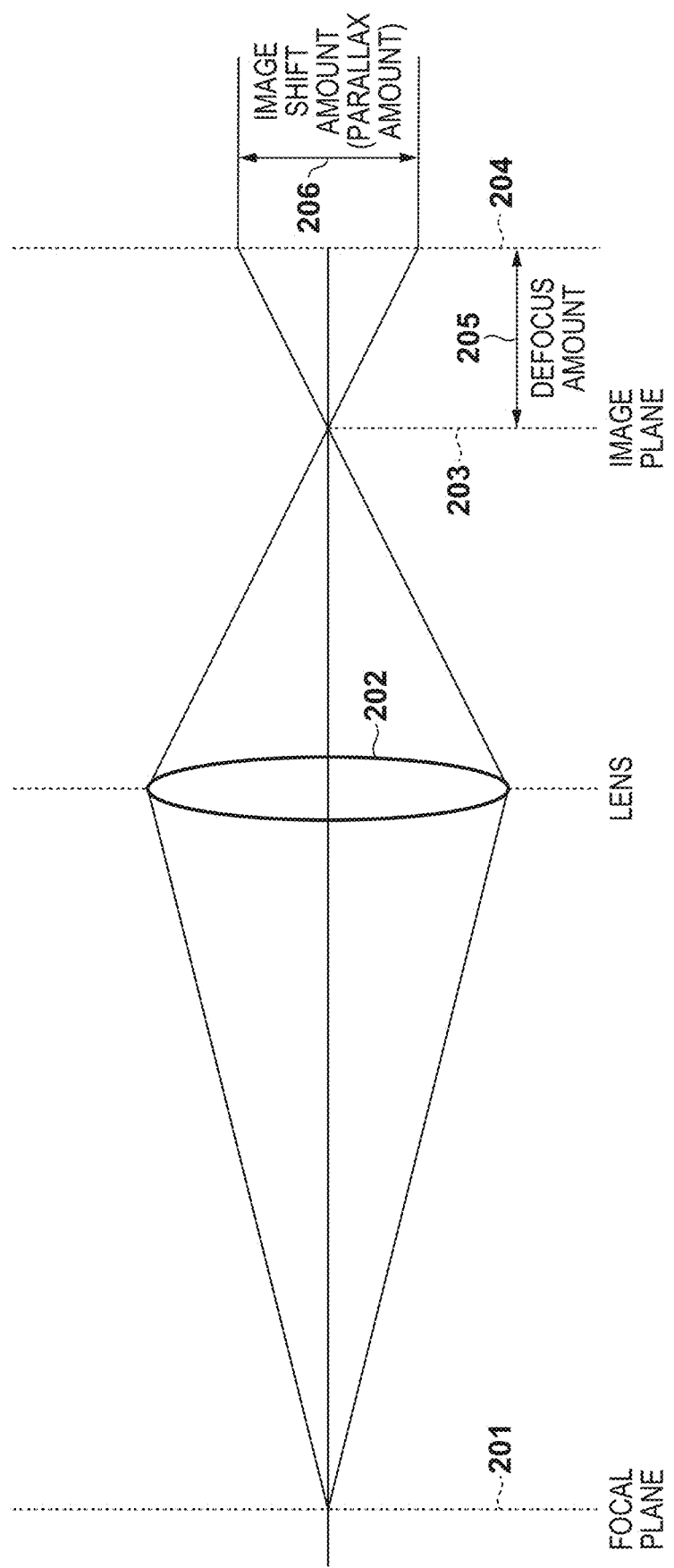
FIG. 2 is a view showing the relationship between the focal plane, the image shift amount, and the defocus amount.

FIG. 2 is a view for explaining the relationship between the focal plane, the image shift amount, and the defocus amount at the time of shooting an object.

In FIG. 2, a focal plane 201 is an in-focus plane parallel to an image plane (image sensing plane) 203 in the image capturing apparatus. A defocus amount 205 is a difference between the image plane 203 and a defocused image sensing plane position 204 (a difference between a prospective imaging plane and an actual imaging plane), and is proportional to a blurring amount. As for the defocus amount 205, there are conventionally known a pupil division type phase difference detection method and an image capturing apparatus configured to detect a defocus amount using differently blurring images.

For example, Japanese Patent Laid-Open No. 2008-15754 has disclosed a method of calculating the defocus amount 205 from an image shift amount (a parallax amount) 206 of an image shown in FIG. 2. A correlation value is calculated while relatively shifting data with respect to a pair of pixel data obtained by photoelectric conversion of beams having passed through different regions of the exit pupil of an imaging lens. The image shift amount 206 having the highest correlation serves as a parallax amount.

Further, the defocus amount 205 from the prospective imaging plane of an object image plane is calculated with respect to the calculated image shift amount 206 using a conversion factor determined in accordance with the pixel pitch of an image sensor and a lens. Japanese Patent Laid-Open No. 2013-253964 has disclosed a method of calculating a defocus amount by the Depth From Defocus (DFD) method. In the DFD method, differently blurring images are obtained by controlling the photographing parameters of an image sensing optical system, a measurement target pixel and its neighboring pixel in a plurality of obtained images are used to calculate a correlation amount between their blurs, and a defocus amount is calculated.

Next, a method of calculating a distance between the focal plane and the object will be described.

Figure 3:
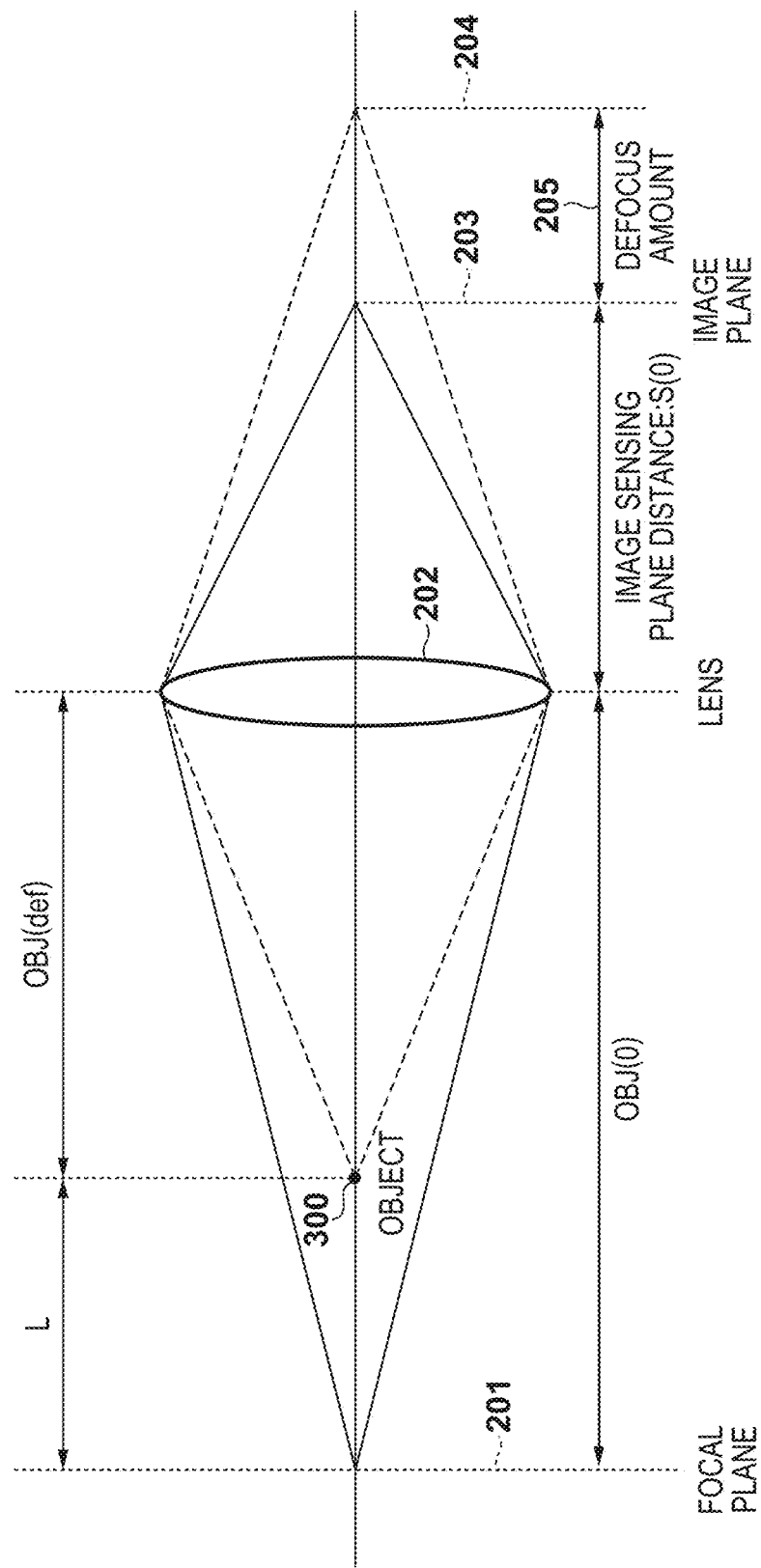
FIG. 3 is a view showing the relationship between the focal object distance, the image sensing plane distance to a focal image object, the object distance, and the distance from the focal plane to the object in an image capturing apparatus.

FIG. 3 is a view showing the relationship between the focal plane, the object, the lens, and the image plane.

In FIG. 3, the formula of a lens is established between a distance OBJ(0) between the lens 202 and the focal plane 201, a distance S(0) between the lens 202 and the image plane 203, a distance OBJ(def) between an object 300 and the lens 202, and a distance L between the focal plane 201 and the object 300. In other words, equations (1) and (2) below are established, so the object distance OBJ(def) can be calculated by equation (3):

$$1/OBJ(0)+1/S(0)=1/f \tag{1}$$

$$1/OBJ(def)+1/\{S(0)+def\}=1/f \tag{2}$$

$$OBJ(def)=\{(S(0)+def)*f\}/\{(S(0)-def)*f\} \tag{3}$$

where OBJ(0) is the focal object distance, S(0) is the image sensing plane distance, and OBJ(def) is the object distance. The distance L from the focal plane 201 to the object 300 can be calculated by subtracting the object distance OBJ(def) calculated by equation (3) from the object distance OBJ(0).

The above-mentioned information equivalent to a distance from the focal plane is information proportional to a distance from the focal plane. The information equivalent to a distance from the focal plane can be any of the image shift amount 206, the defocus amount 205, and the distance L from the focal plane to the object.

Next, a defocus map will be explained.

Figure 4A:
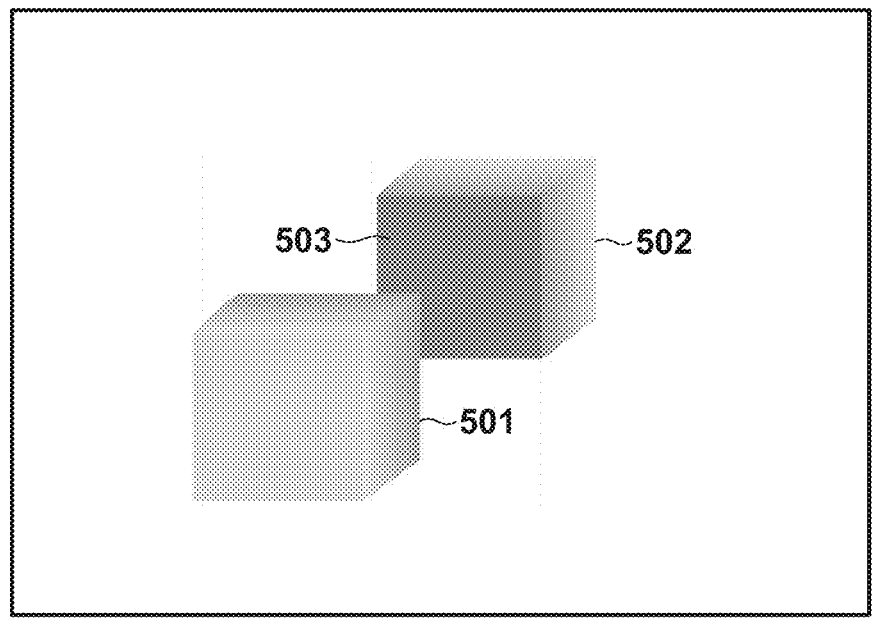
FIGS. 4A and 4B are views exemplifying a defocus map and each area.
Figure 4B:
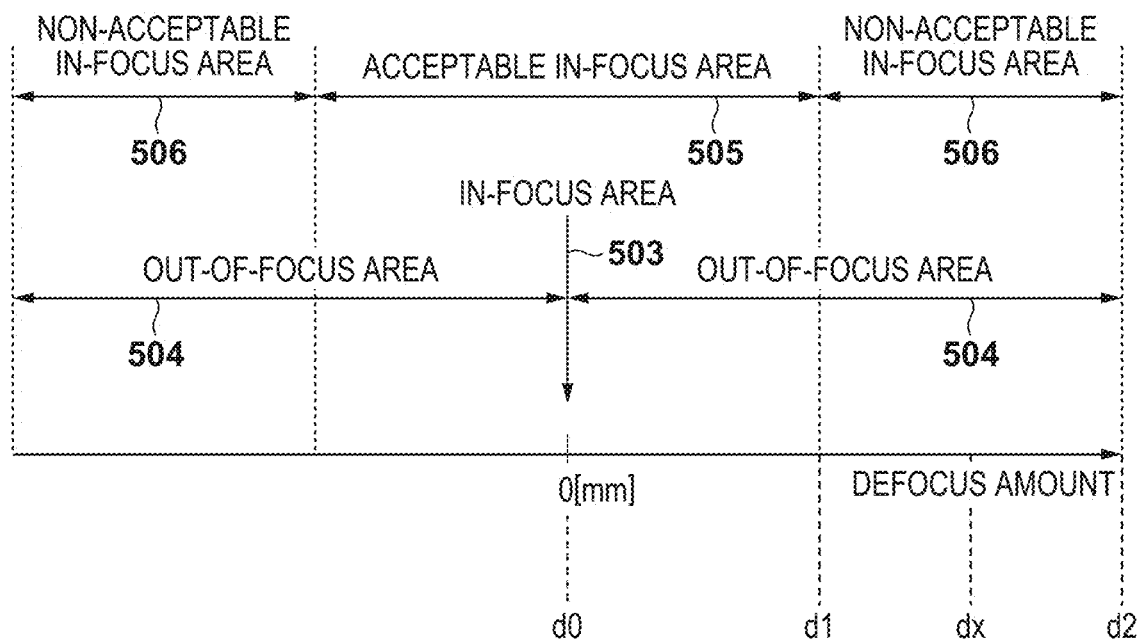

FIGS. 4A and 4B are views for explaining the defocus map.

The defocus map is a map of defocus amounts descried above at a plurality of portions on an input image. Here, the defocus map holds information of defocus amounts corresponding to respective pixels of image data obtained by shooting two cubes 501 and 502 as shown in FIG. 4A. FIG. 4B is a view for explaining the defocus amount and each area used in image processing here.

In FIG. 4B, a defocus amount 0 is a defocus amount equivalent to a focal plane at the time of shooting and corresponds to a blackest portion (an area 503) in FIG. 4A. As the defocus amount moves apart from the defocus amount 0, the image becomes whitish in FIG. 4A. In the defocus map shown in FIG. 4A, an area of the defocus amount 0 is the area 503 and is an in-focus (focal plane) image area. This area will be called an "in-focus area" as represented by 503 in FIG. 4B.

An area other than the in-focus area 503 will be called an out-of-focus area 504 that is an area not corresponding to the focal plane on the defocus map. An area accepted to be in focus will be called an acceptable in-focus area 505. An area other than the acceptable in-focus area 505 will be called a non-acceptable in-focus area 506 as an area that is not the acceptable in-focus area 505. The range of the acceptable in-focus area 505 is defined by, for example, the depth of field and information equivalent to a distance from the focal plane. The acceptable in-focus area may arbitrarily be defined by subject experiment.

The abscissa represents the defocus amount in FIG. 4B, but may be the above-described image shift amount or information of a distance from the focal plane, which is information equivalent to a distance from the focal plane. In FIG. 4B, d0 represents a defocus amount of 0, that is, an in-focus area, and dx represents a defocus amount in the non-acceptable in-focus area.

The contrast reproduction characteristics of the input image data will be described.

Figure 5A:
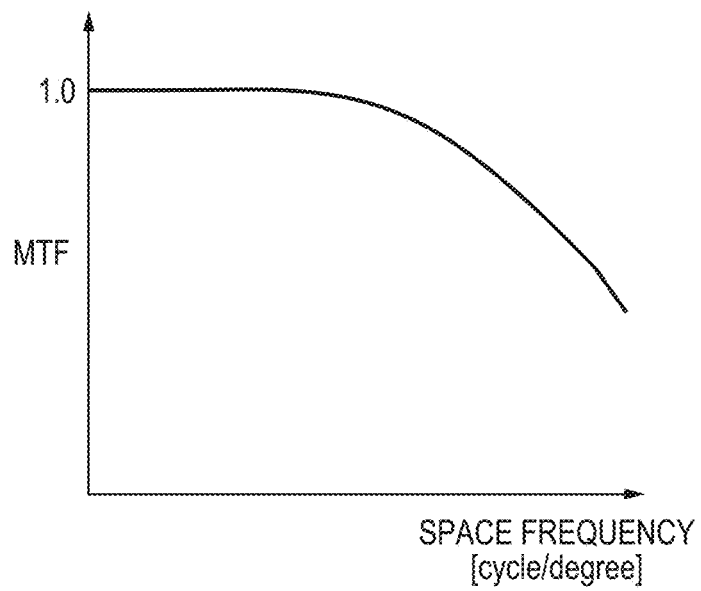
FIGS. 5A and 5B are graphs each showing the contrast reproduction characteristics of image data obtained by shooting an object by an image capturing apparatus.
Figure 5B:
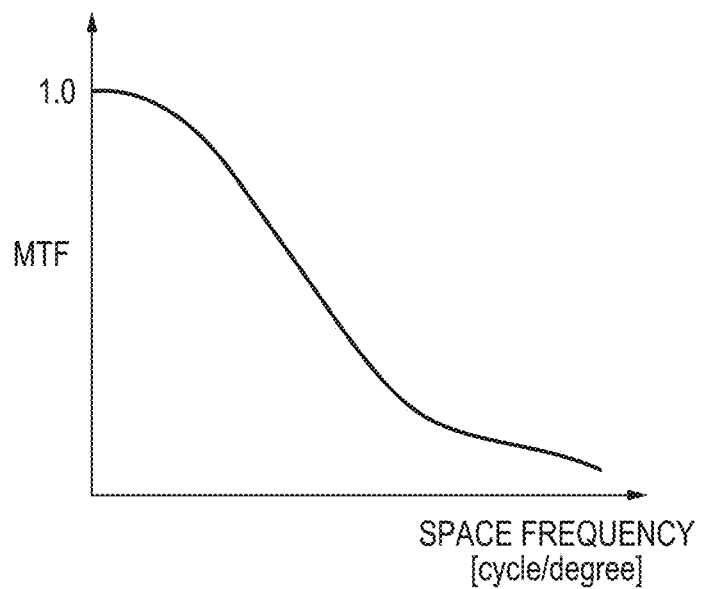

FIGS. 5A and 5B are graphs each showing the contrast reproduction characteristics of image data obtained by shooting an object by the image capturing apparatus. In FIGS. 5A and 5B, the abscissa represents a spatial frequency and the ordinate represents an MTF (Modulation Transfer Function), and the MTF is a general index indicating, by spatial frequency characteristics, the degree of fidelity at which the contrast of the object can be reproduced. Note that the ordinate may represent a CTF (Contrast Transfer Function) (to be described later), and may represent any index indicating the degree of fidelity at which the contrast can be reproduced. In this embodiment, the degree of fidelity at which the image data output from the image capturing apparatus can reproduce the contrast of the object is indicated using an MTF.

FIG. 5A exemplifies the characteristics of the in-focus area (defocus amount=0), and FIG. 5B exemplifies characteristics at a specific defocus amount in the out-of-focus area. These characteristics change depending on image degradation of the image sensing optical system, settings of the image capturing apparatus, image processing in the image capturing apparatus, and the like. Therefore, even at the same defocus amount, the contrast reproduction characteristics change depending on the above conditions. Since the contrast reproduction characteristics are calculated by a known method, as is known with respect to the MTF characteristics of the image capturing apparatus, a detailed description thereof will be omitted.

The image degradation of the image sensing optical system indicates degradation of image data obtained by receiving light by the image sensor via the image sensing optical system, and is represented by an OTF (Optical Transfer Function) including a lens and various optical filters. The image sensing optical system may be formed using not only the lens but also a mirror (reflecting surface) having a curvature. The above-described OTF not only changes depending on the aperture value, the focal length, or the like of the image sensing optical system as an image capturing condition but also changes depending on the position of the image and changes depending on the focus state of the image sensing optical system with respect to the object.

As described above, the above-described contrast reproduction characteristics may change due to image degradation of the image sensing optical system. This embodiment will exemplify the contrast reproduction characteristics of the center image height of the image sensing optical system. On the other hand, the image processing in the image capturing apparatus may include, for example, processing of recovering the image degradation of the image sensing optical system. The image degradation caused by the image sensing optical system can be recovered by a method of convoluting an image recovery filter in a real space having the reverse characteristics of the optical transfer function with respect to the image data. The recovery processing may be performed by executing correction processing at the time of development processing by development software installed in the image capturing apparatus or the PC 101. Alternatively, the recovery processing may be performed by executing, as image processing in the image capturing apparatus, various filter processes for picture making, such as sharpness processing.

As described above, contrast reproduction characteristics corresponding to image data output from the image capturing apparatus are set in accordance with various factors.

Next, image processing for printing an image with a three-dimensional appearance on a print medium in the image processing system having the above-described arrangement will be described.

<General Description of Image Processing (FIGS. 6 and 7)>

FIG. 6 is a block diagram showing the arrangement of the image processing unit 110.

As shown in FIG. 6, the image processing unit 110 is constituted by a three-dimensional appearance control unit 401 and an output image generation unit 402. The three-dimensional appearance control unit 401 receives image data and a defocus map transmitted from the PC 101. Furthermore, the three-dimensional appearance control unit 401 receives an image processing condition 603 corresponding to the image characteristics related information, which is set based on the output characteristics of the output apparatus and is stored in the storage device 105 or the storage device (the hard disk, the ROM, or the like) of the output apparatus 102. Then, the three-dimensional appearance control unit 401 executes image processing for giving a three-dimensional appearance to the image. Based on image data (RGB) output from the three-dimensional appearance control unit 401, the output image generation unit 402 generates data to be used to print an image by discharging ink from the printhead of the inkjet printer.

FIG. 7 is a flowchart showing the image processing for giving a three-dimensional appearance.

First, in steps S601 and S602, the image processing unit 110 receives image data, and the above-described defocus map as information equivalent to a distance from the focal plane at the time of shooting an object. Then, in step S603, an image capturing apparatus type, a lens type, and an aperture value at the time of shooting are input as the image characteristics related information. In step S604, the three-dimensional appearance control unit 401 receives an image processing condition that is set based on the output characteristics of the output apparatus 102 and is stored in the storage device 105 or a storage device (not shown) such as the hard disk or ROM in the output apparatus 102. In this case, an image processing condition is held in the storage device for each combination of image characteristics related information and a print condition. An image processing condition is selected in accordance with the above-described image characteristics related information and print information data and input to the three-dimensional appearance control unit 401.

In step S605, the three-dimensional appearance of the image is controlled in accordance with the input image data, the defocus map, the image characteristics related information, and the image processing condition set based on the output characteristics of the output apparatus 102. Note that details of processing in the three-dimensional appearance control unit 401 and details of the image processing condition will be described later.

In step S606, the output image generation unit 402 generates data used to print an image by discharging ink from the inkjet printhead based on image data (RGB) output from the three-dimensional appearance control unit 401. The generation processing includes color conversion processing of converting device-independent RGB data into device-dependent RGB data, ink color decomposition processing of converting the device-dependent RGB data into ink color data, and tone correction processing of performing tone correction to linearly associate the ink color data with the gradation characteristic of a printing apparatus. Further, the ink color data undergoes half-toning processing for ON/OFF information of ink dots, mask data conversion processing of generating binary data to be printed by each print scanning of the printhead, and the like. These processes are well known ones in the inkjet printer and are not a part concerning the gist of the embodiment, so a detailed description thereof will be omitted.

Finally, in step S607, the output data generated by the output image generation unit 402 is transferred to the print unit 111, and an image is printed on a print medium based on the output data.

<Characteristics of Shot Image and Three-Dimensional Appearance in Output Apparatus>

The output characteristics of the output apparatus 102 that influence the sharpness, and control of the three-dimensional appearance will now be described.

When looking at a two-dimensional image shot by a camera or the like, one feels the sense of depth and three-dimensional appearance of the image from the sharpness difference between an acceptable in-focus area including a focused (in-focus) area and a defocused (out-of-focus) non-acceptable in-focus area. Therefore, if the output apparatus can reproduce the contrast reproduction characteristics (sharpness relationship) of the input image data, one can feel the three-dimensional appearance from the sharpness difference of the image data.

When an image is output through an output apparatus such as a printer described here, the sharpness of the image degrades owing to, for example, degradation of the sharpness of the image by a print medium or ink bleeding, or resolution conversion processing of resizing input image data into a print medium size (print size). The sharpness of an output image similarly degrades even on a display or a projector.

The sharpness of an input image depending on the output characteristics of the output apparatus greatly changes in the (in-focus) acceptable in-focus area where the sharpness of input data is high, and hardly changes in the (out-of-focus) non-acceptable in-focus area where the sharpness of input data is low. A change amount of the sharpness is different between areas. For this reason, an output image does not maintain the sharpness relationship (contrast reproduction characteristics relationship) between the acceptable in-focus area and the non-acceptable in-focus area that influences the three-dimensional appearance of an input image.

Figure 8A:
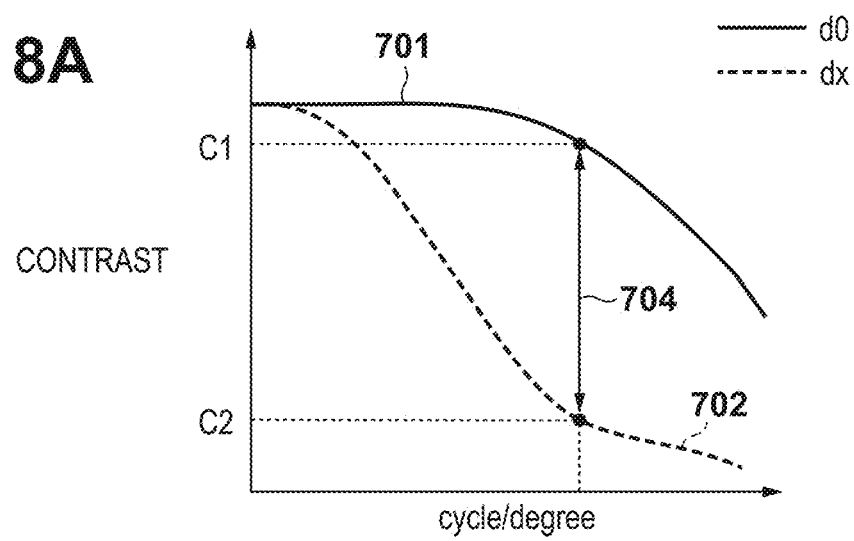
FIGS. 8A, 8B, and 8C are graphs showing the relationship in contrast at a specific frequency between the in-focus area and out-of-focus area of an image at a specific defocus amount.
Figure 8B:
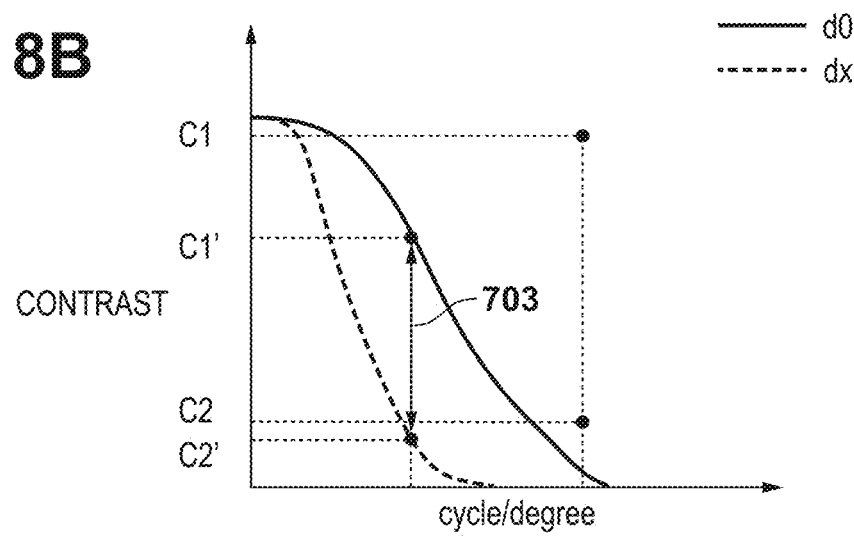
Figure 8C:
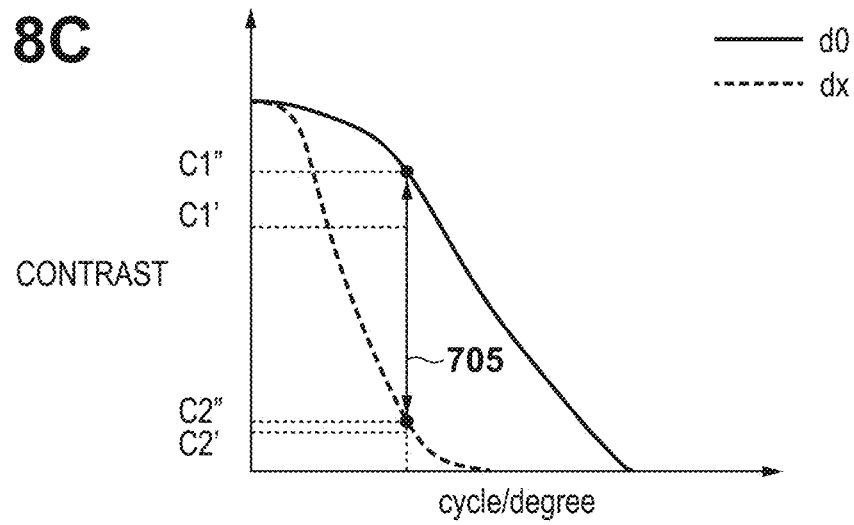

FIGS. 8A to 8C are graphs showing the relationship between the contrast and the spatial frequency (cycle/degree). In FIG. 8A to 8C, a solid line d0 represents a contrast at a defocus amount of 0, that is, in the in-focus area, and a dotted line dx represents a contrast at the defocus amount dx, that is, in the non-acceptable in-focus area.

Note that in FIGS. 8A to 8C, for descriptive convenience, an image is treated as an image in which the spatial frequency characteristics of the image in the in-focus area and the spatial frequency characteristics of the image corresponding to a specific defocus amount included in the out-of-focus area have peaks at the same frequency. In this case, an input image undergoes enlargement processing to resize it into a print medium size and then is output to the printer. As for the output characteristics shown in FIGS. 8A to 8C, enlargement processing is exemplified as resolution conversion processing, but the resolution conversion processing may be same size processing or reduction processing.

In an input image that has a three-dimensional appearance due to blurs, a contrast value C1 representing a sharpness in the in-focus area of input image data at a specific spatial frequency and a contrast value C2 representing a sharpness in the out-of-focus area have a relationship shown in FIG. 8A. In FIG. 8A, frequency characteristics 701 correspond to the characteristics shown in FIG. 5A, and frequency characteristics 702 correspond to the characteristics shown in FIG. 5B. When this input image is enlarged, the contrast values C1 and C2 change to C1' and C2', as shown in FIG. 8B.

Although this embodiment exemplifies contrast degradation caused by enlargement processing of image data, if the output apparatus is a printer, the contrast degrades due to ink bleeding or the like. Contrast degradation in the output apparatus caused by ink bleeding or the like may change depending on, for example, an amplitude value for each frequency component. Thus, a degradation amount (degradation characteristics) is different for each defocusing.

As is apparent from FIGS. 8A and 8B, the change amount of the sharpness of the input image is different between the in-focus area and the out-of-focus area in accordance with the output characteristics of the output apparatus 102. A sharpness difference 703 (a difference between the contrast values C1' and C2') that influences the three-dimensional appearance becomes smaller than a sharpness difference 704 (a difference between the contrast values C1 and C2) in the input image. As a result, the output image cannot obtain a proper three-dimensional appearance. To solve this, the sharpness is properly controlled based on an image blurring state equivalent to the above-described defocus amount and the output characteristics of the output apparatus 102 that influence the sharpness, thereby obtaining an output image with a three-dimensional appearance.

In an output image, the sharpness of the image is properly controlled using the relationship between the three-dimensional appearance control amount and the defocus amount based on the output characteristics of the output apparatus 102 by targeting the contrast reproduction characteristics of the input image set in an image output condition (to be described later). In the output image, the contrast values of the in-focus area and out-of-focus area have a relationship shown in FIG. 8C. In FIG. 8C, C1" denotes the contrast value of the in-focus area and C2" denotes the contrast value of the out-of-focus area.

As shown in FIG. 8C, in an output image having undergone three-dimensional appearance control processing based on the image output condition, a sharpness difference 705 (a difference between the contrast values C1" and C2") becomes larger than the sharpness difference 703 (the difference between the contrast values C1' and C2') obtained when no processing is performed.

The sharpness difference 705 comes close to the sharpness difference 704 (the difference 701 between the contrast values C1 and C2) in the input image.

As described above, the sharpness difference between the defocus amounts is made by controlling the output image by targeting the contrast reproduction characteristics of the input image, thereby obtaining a proper three-dimensional appearance. On the other hand, depending on the output characteristics of the output apparatus, the sharpness largely degrades in the in-focus area, and thus it may be impossible to recover the contrast to the target. In this case, for example, by decreasing the control amount of the sharpness of the out-of-focus area, as compared with the in-focus area, based on the target (as an extreme example, by setting the control amount in the out-of-focus area to 0) to make a sharpness difference between the defocus amounts, it is possible to obtain a proper three-dimensional appearance.

In FIGS. 8A to 8C, contrasts at two points of an image that correspond to the spatial frequency of the image in the in-focus area and a specific defocus amount included in the out-of-focus area are compared for descriptive convenience. The above-described relationship is established even for the in-focus area and an image corresponding to another defocus amount in the out-of-focus area. Also, the above-described relationship is established even at two points corresponding to an image corresponding to a specific defocus amount included in the acceptable in-focus area and corresponding to a specific defocus amount included in the non-acceptable in-focus area.

The contrast value has been picked up as an image characteristic that influences the sharpness of an image. As for a change of the sharpness of an image in the in-focus area and the out-of-focus area depending on the output characteristic of the output apparatus 102, it is obvious that the same relationship can be explained even in a spatial frequency characteristic representing the sharpness.

<Three-Dimensional Appearance Control Processing (FIGS. 9A to 10B)>

Three-dimensional appearance control processing performed by the three-dimensional appearance control unit 401 will be described below.

The three-dimensional appearance control unit 401 controls the sharpness of input image data using a sharpness control parameter set in the image processing condition 603. A three-dimensional appearance control amount corresponding to each defocus amount is set in the image processing condition.

Figure 9A:
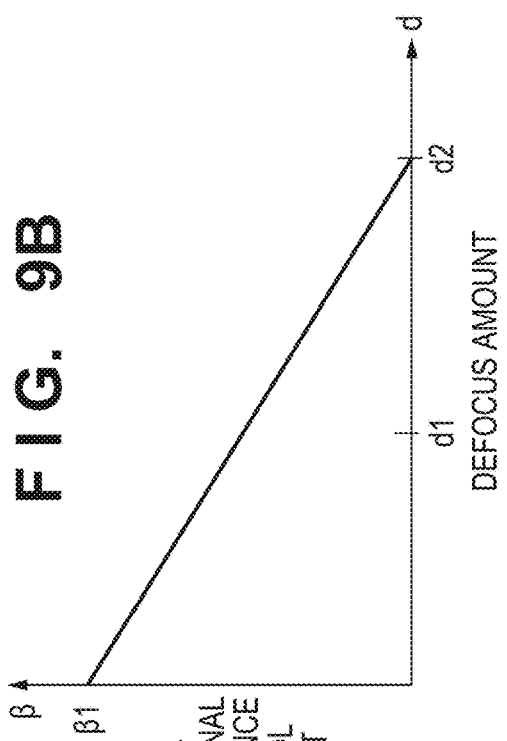
FIGS. 9A and 9B are graphs showing the relationship between the defocus amount and the three-dimensional appearance control amount.
Figure 9B:
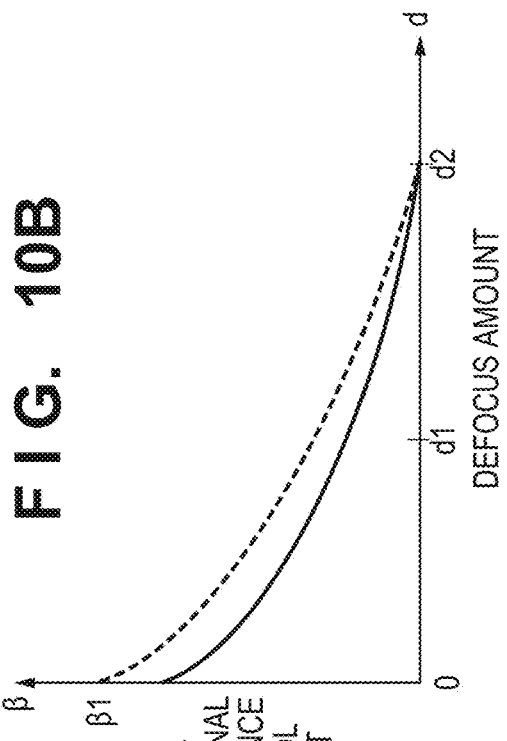

FIGS. 9A and 9B are graphs showing the relationship between the defocus amount and the three-dimensional appearance control amount that is set in the image processing condition. Note that an image processing condition creation method will be described below.

The three-dimensional appearance control unit 401 performs sharpness processing by applying a three-dimensional appearance control amount set in the image processing condition while referring to a defocus amount in the defocus map for a processing target pixel with respect to brightness information of each pixel of input image data. The sharpness processing uses, for example, a Laplacian Of Gaussian filter (equation (4)) or an unsharp mask. Equation (5) is a transformation for brightness information of input image data in use of the Laplacian Of Gaussian filter represented by equation (4):

$$h(x,y)=(x^2+y^2-2\sigma^2)/(2\pi\sigma^2)\cdot\exp[-(x^2+y^2)/(2\sigma^2)] \quad (4)$$

$$\text{Out}(x,y)=I(x,y)-\beta\times h(x,y)\times I(x,y) \quad (5)$$

wherein Out(x,y) is image data after three-dimensional appearance control processing, and β is a three-dimensional appearance control amount with respect to a defocus amount set in the image processing condition.

In FIGS. 9A and 9B, β=β1 at the defocus amount d=0 represents a control amount for the in-focus area of an input image. A defocus amount d1 is a value at the boundary between the acceptable in-focus area and the non-acceptable in-focus area shown in FIG. 4B. A defocus amount d2 is a maximum defocus amount included in the defocus map.

This three-dimensional appearance control amount is a control amount obtained by targeting the contrast reproduction characteristics of the input image at each defocus amount. Then, when the abscissa represents the defocus amount as information equivalent to a distance from the focal plane, for example, the defocus amount and the three-dimensional appearance control amount have a non-linear relationship, as shown in FIG. 9A. To the contrary, when the abscissa represents the image shift amount, for example, a linear relationship shown in FIG. 9B is obtained. As described above, the relationship with the three-dimensional appearance control amount changes depending on information equivalent to a distance from the focal plane.

The control amount differs depending on the characteristic of a print medium, that of ink, and the print medium size. This is because the degree of degradation of the sharpness of an image by ink bleeding or the like changes for each print medium or each ink characteristic, and the resizing ratio of resolution conversion processing changes depending on the print medium size.

Figure 10A:
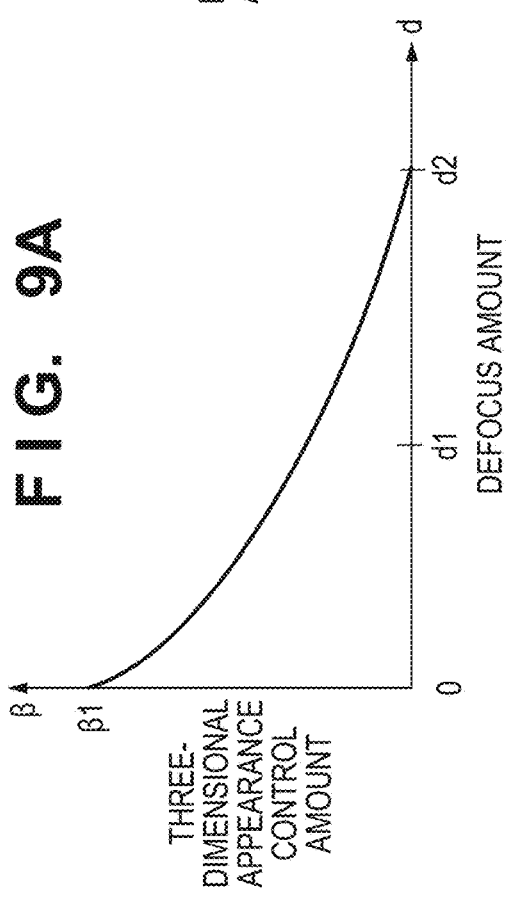
FIGS. 10A and 10B are graphs showing the relationship between the defocus amount and the three-dimensional appearance control amount when a print medium or a print medium size is different.
Figure 10B:
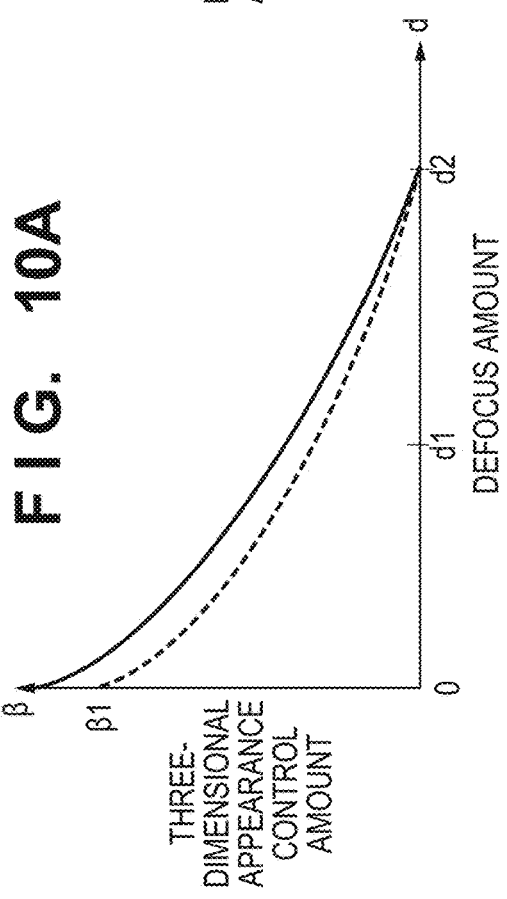

FIGS. 10A and 10B are graphs showing the difference of the three-dimensional appearance control amount depending on the characteristic of a print medium, that of ink, and the print medium size. In FIGS. 10A and 10B, a broken line represents the same output characteristic as that shown in FIG. 9A.

In FIG. 10A, a solid line represents a three-dimensional appearance control amount with respect to a defocus amount when an image is output under a condition different from that in FIG. 9A. The output characteristic shown in FIG. 10A represents a case in which the three-dimensional appearance control amount is large because, for example, ink bleeding is larger than that in FIG. 9A or the resizing ratio is larger. To the contrary, the output characteristic shown in FIG. 10B represents a case in which the three-dimensional appearance control amount is small because ink bleeding is smaller than that in FIG. 9A or the resizing ratio is smaller.

Note that the filter used in sharpness processing is not limited to the Laplacian Of Gaussian filter. For example, a filter (specific filter) created by obtaining the inverse characteristic of degradation information of the sharpness of the output apparatus may be used to perform sharpness processing, and adjust and control the sharpness.

The sharpness processing has been exemplified as processing of controlling the sharpness. However, for example, contrast processing may be executed as long as the sharpness can be controlled by targeting the contrast reproduction characteristics of the input image. Since both the sharpness processing and the contrast processing can control the sharpness of an output image, one of the processes may be selected in accordance with the characteristics of the output apparatus or both of them may be used in combination.

<Image Processing Condition (FIGS. 11 to 13)>

An image processing condition creation method in three-dimensional appearance control processing will be described here.

Figure 11:
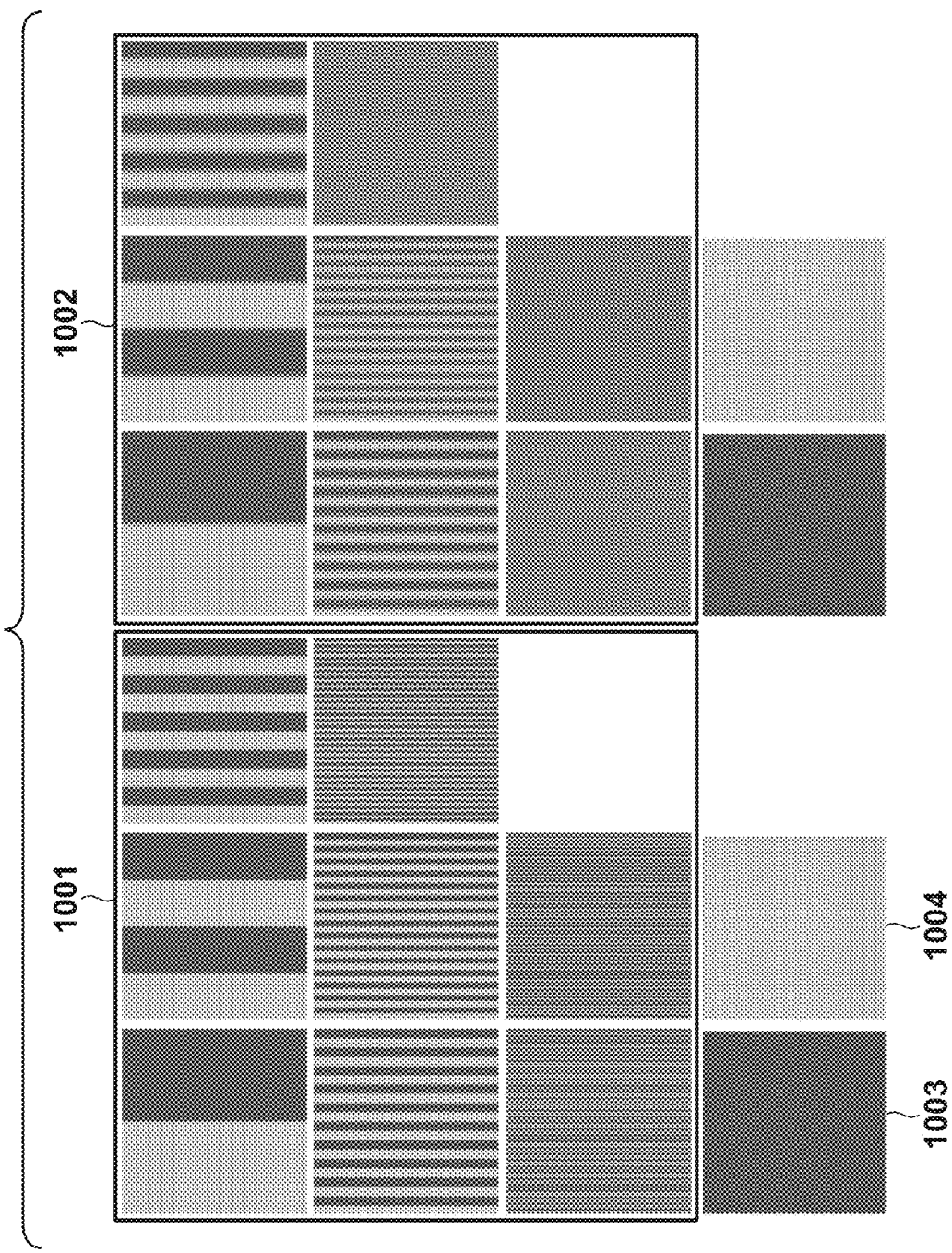
FIG. 11 is a view showing an image for measurement for calculating the frequency characteristic (MTF characteristic) of an output image.

FIG. 11 is a view showing an example of an image for measurement.

For example, an image for measurement as shown in FIG. 11 is output from an output apparatus such as a printer, a display, or a projector. Then, a parameter to be set as an image processing condition 603 is calculated from the frequency characteristic (MTF characteristic) of the output image from the output apparatus that is obtained using a measurement apparatus (not shown). Instead of actually measuring the output image using the measurement apparatus, the MTF characteristic of the output apparatus may be calculated from an image obtained by simulating, on the PC, each image processing when generating the output image.

A sample image shown in FIG. 11 is an image corresponding to the contrast reproduction characteristics of the input image shown in FIG. 5. This sample image includes an image group 1001 corresponding to FIG. 5A and corresponding to the in-focus focal plane and an image group 1002 corresponding to FIG. 5B and represented by blurring equivalent to the blurring amount of the input image at a given defocus amount. More specifically, the sample image is a chart including a plurality of rectangular patterns or sinusoidal patterns of different frequencies, and uniform patterns 1003 and 1004.

In the example shown in FIG. 11, the image groups 1001 and 1002 are formed from a plurality of sinusoidal patterns of different frequencies. The uniform patterns 1003 and 1004 are formed from maximum and minimum pixel values on the sinusoidal pattern, respectively.

Figure 12:
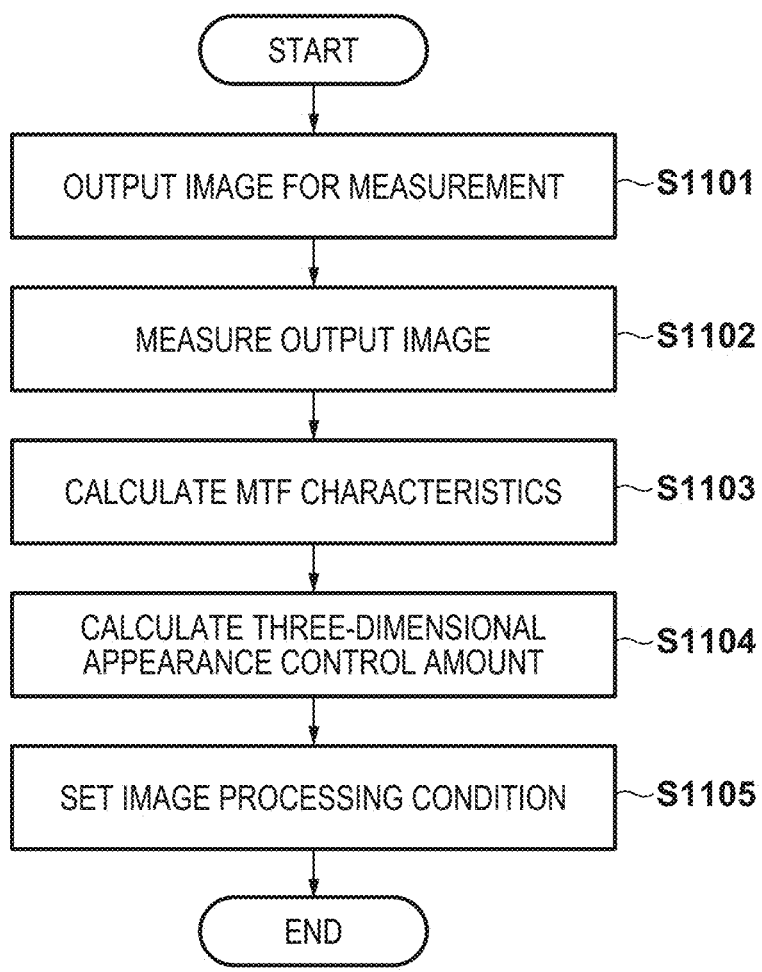
FIG. 12 is a flowchart showing image processing condition creation processing.

FIG. 12 is a flowchart showing an image processing condition creation method.

First, in step S1101, the image for measurement shown in FIG. 11 is output from the output apparatus 102. Then, in step S1102, the image for measurement output from the output apparatus 102 is measured using the measurement apparatus to obtain information necessary to calculate the MTF characteristic.

In a case where the image for measurement is formed from sinusoidal patterns of different frequencies as shown in FIG. 10, the MTF characteristic is calculated using equation (6) or equation (7) in step S1103. This value means the absolute value of an optical transfer function. If the average luminosity of the output image changes, equation (7) is used preferably. Equation (6) and equation (7) are:

$$\mathrm{MTF}(u)=\{C(u)\}/C' \quad (6)$$

u: frequency of a sine wave $$C(u)=\{\mathrm{Max}(u)-\mathrm{Min}(u)\}/\{\mathrm{Max}(u)+\mathrm{Min}(u)\}$$

$$C'=\{(R1-R2)\}/\{(R1+R2)\}$$

Max(u): maximum reflectance of a sinusoidal pattern that changes depending on the frequency Min(u): minimum reflectance of a sinusoidal pattern that changes depending on the frequency R1, R2: reflectances of a uniform pattern (R1>R2)

$$\mathrm{MTF}(u)=\{\mathrm{Max}(u)-\mathrm{Min}(u)\}/\{R1-R2\} \quad (7)$$

Note that the R1 and R2 values in equation (6) and equation (7) are reflectances, but the brightness, density, or device RGB value may be used, as a matter of course. The measurement apparatus can be, for example, a scanner, a digital camera, or a microscope if the output apparatus is a printer, and can be a digital camera if the output apparatus is a display or a projector.

In a case where the image for measurement is a rectangular wave pattern, the MTF characteristic of the output apparatus is expressed by a contrast transfer function (CTF) obtained by applying equation (6) or equation (7). Alternatively, an MTF value converted from a CTF value using the Coltman correction equation may be used.

By the above-described method, the frequency characteristics (MTF characteristics) of each image in the image group 1001 corresponding to the focal plane included in the image for measurement and the image group 1002 corresponding to any desired defocus amount are obtained.

Figure 13:
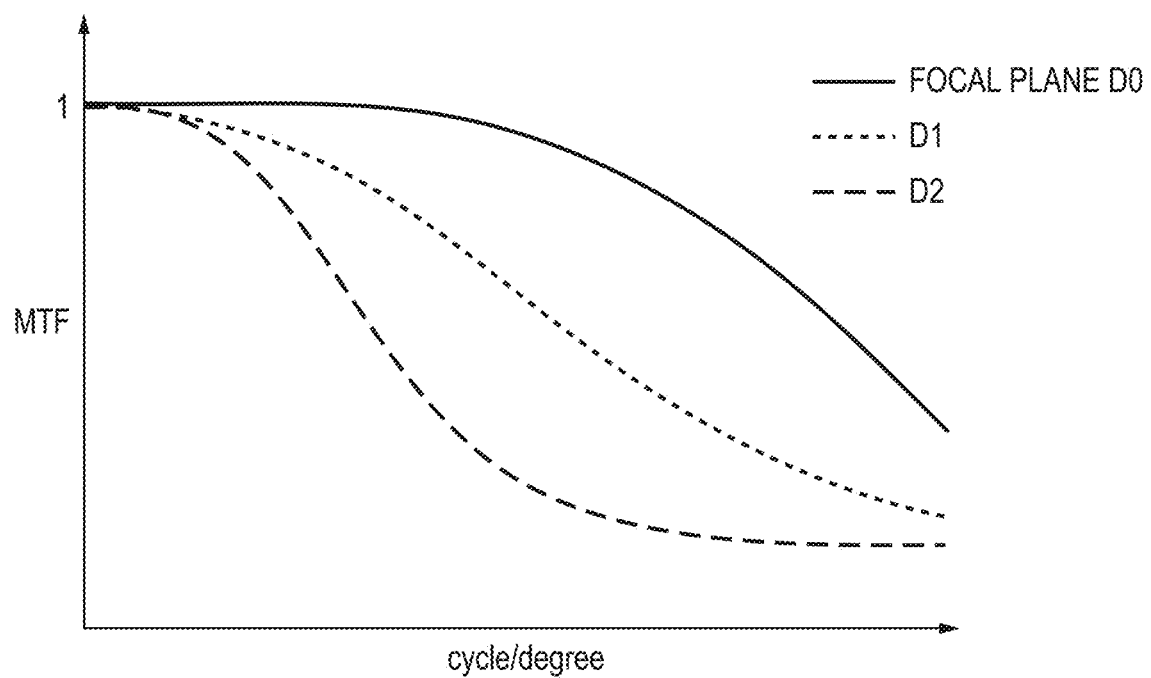
FIG. 13 is a graph exemplifying the frequency characteristics (MTF characteristics) of pixel groups corresponding to the focal plane and an arbitrary defocus amount.

FIG. 13 is a graph showing an example of the frequency characteristic.

In FIG. 13, a solid line D0 represents the characteristic of the image group 1001 corresponding to the focal plane, a dotted line D1 represents the characteristic of an image group corresponding to a defocus amount included in the acceptable in-focus area, and a broken line D2 represents the characteristic of an image group corresponding to a defocus amount included in the non-acceptable in-focus area.

An MTF characteristic can therefore be obtained for each defocus amount. That is, the output characteristic of the output apparatus regarding the sharpness for each defocus amount is obtained.

To obtain a proper three-dimensional appearance in an output image, the sharpness difference between the acceptable in-focus area and the non-acceptable in-focus area in the output image needs to come close to the sharpness difference between the acceptable in-focus area and the non-acceptable in-focus area in an input image in the case of applying three-dimensional appearance control processing, compared to the case of not applying this processing. In other words, to properly control the sharpness difference between the acceptable in-focus area and the non-acceptable in-focus area in an output image, the three-dimensional appearance control amount needs to be set in accordance with the output characteristic of the output apparatus that influences the sharpness for each defocus amount.

More specifically, in step S1104, the three-dimensional appearance control amount is set so that the sharpness or frequency characteristic of the in-focus area of the output image at a specific frequency is restored by sharpening processing to the sharpness or frequency characteristic of the input image. Similarly, as for the out-of-focus area, the restoration amount is calculated from an MTF characteristic obtained for each defocus amount and is used as a three-dimensional appearance control amount. In this manner, the three-dimensional appearance control amount is calculated for the defocus amount shown in FIGS. 9A and 9B.

For example, the relationship between the defocus amount and the sharpness is set as a relation that receives a defocus amount and outputs a three-dimensional appearance control amount, as shown in FIGS. 9A and 9B, or is set by selecting a parameter according to the LUT method. Needless to say, the method of setting the relationship is not limited to them and any method is acceptable as long as the three-dimensional appearance control amount can be calculated for the defocus amount.

When the control amount β1 of the focal plane shown in FIGS. 10A and 10B is set to restore the MTF characteristic of an image from 0.8 to 1.2, an image with desirable sharpness on the focal plane in an output image is obtained. In this embodiment, the relationship between the defocus amount and the three-dimensional appearance control amount has been exemplified as the image processing condition. However, the relationship between the three-dimensional appearance control amount and the image shift amount or the distance between the focal plane and the object, which is information equivalent to a distance from the focal plane, may be adopted as the image processing condition.

Finally, in step S1105, an image processing condition derived from the output characteristic of the output apparatus 102 regarding the sharpness in accordance with the defocus amount is set, as described above.

According to the above-described embodiment, the three-dimensional appearance of an output image can be controlled by performing image processing using the defocus map based on an image processing condition set for input image data.

Note that the above-described embodiment has explained the method of properly controlling the sharpness of an image using the relationship between the defocus amount and the three-dimensional appearance control amount based on the output characteristics of the output apparatus by targeting the contrast reproduction characteristics of input image data. As described above, the three-dimensional appearance changes depending on the output characteristics of the output apparatus. Thus, in principle, it is possible to recover the three-dimensional appearance by performing correction for each of various contrast degradation factors of the output apparatus. On the other hand, a degradation factor changes depending on the output condition of the output apparatus, and it is difficult to perform correction for each degradation factor to obtain a proper three-dimensional appearance. To the contrary, according to the above-described embodiment, since the contrast reproduction characteristics of input image data can be processed only by the relationship between the target and the final output characteristics (degradation characteristics) of the output apparatus, it is possible to obtain a proper three-dimensional appearance even in different output apparatuses without considering various degradation factors.

The above-described embodiment has explained processing by exemplifying the contrast reproduction characteristics of the center image height of the image sensing optical system. In fact, however, the contrast reproduction characteristics including image degradation of the image sensing optical system are different for each position in an image at the time of shooting. Therefore, it is desired to perform the processing according to the above-described embodiment for each position in the image. However, if there is no influence on a processing result when the contrast reproduction characteristics for each position in the image are used and when part of the image (for example, the center image height of the image sensing optical system) is used, the entire image may be processed based on the contrast reproduction characteristics of the part of the image.

Furthermore, the above-described embodiment has explained the example of calculating the contrast reproduction characteristics of image data in accordance with various factors. However, target contrast reproduction characteristics may be set without reflecting a small factor that does not influence a processing result and influences the contrast reproduction characteristics.

In addition, the output characteristics of the output apparatus may also change due to various factors of the output apparatus depending on a position in an image or an amplitude value for each frequency component in each pixel in the image. Although it is desirable to perform correction for each pixel, if there is no influence on a processing result even by performing processing by limiting output characteristics to those concerning a representative value, the entire image may be processed based on the output characteristics concerning the representative value.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-034737, filed Feb. 27, 2019, which is hereby incorporated by reference herein in its entirety.

What is claimed is:

1. An image processing apparatus comprising:
   at least one processor or circuit configured to function as a plurality of units comprising:
   (1) a setting unit configured to set an image processing condition for performing image processing, that is set based on (a) output characteristics of an output apparatus that outputs image data and (b) image characteristics related information obtained when the image data is obtained by image-capturing an object; and
   (2) an image processing unit configured to process the image data to control sharpness representing a three-dimensional appearance of an image, using (a) distance information equivalent to a distance from a focal plane at the time of image-capturing the object and (b) the image processing condition set by the setting unit,
   wherein the image processing unit processes the image data to control the sharpness, by targeting contrast reproduction characteristics of the image data obtained by the image-capturing the object.

2. The apparatus according to claim 1, wherein the image characteristics related information is information for calculating or specifying the contrast reproduction characteristics, and is an image capturing condition of an image capturing apparatus used to obtain the image data.

3. The apparatus according to claim 2, wherein the contrast reproduction characteristics are represented by spatial frequency characteristics of an MTF (Modulation Transfer Function).

4. The apparatus according to claim 2, wherein the image capturing condition is at least one of an image capturing apparatus type, a lens type, and an aperture value at the time of shooting.

5. The apparatus according to claim 1, wherein the image processing unit uses, as the distance information, at least one of (1) a defocus amount corresponding to each pixel of the image data, (2) a distance from the focal plane to the object, or (3) a parallax amount.

6. The apparatus according to claim 1, wherein the image processing unit processes the image data so that the sharpness degrades as the distance information is larger.

7. The apparatus according to claim 1, wherein the image processing unit processes the image data so that a contrast of the image data in an acceptable in-focus area including an in-focus area at the time of image-capturing the object increases.

8. The apparatus according to claim 1, wherein the setting unit includes:
   a calculation unit configured to calculate MTF characteristics as the output characteristics based on information obtained from a sample image; and
   a derivation unit configured to derive the image processing condition based on the MTF characteristics calculated by the calculation unit.

9. The apparatus according to claim 1, wherein the image processing apparatus is included in one of a personal computer and the output apparatus.

10. The apparatus according to claim 1, wherein the output apparatus comprises an inkjet printer configured to print an image by discharging ink onto a print medium.

11. The apparatus according to claim 1, wherein the image characteristics related information is the contrast reproduction characteristics of the image data.

12. A non-transitory computer-readable storage medium which stores a computer program to be executed in a processor of an image processing apparatus, wherein the program, when executed, carries out a method comprising:
   setting an image processing condition for performing image processing, that is set based on (a) output characteristics of an output apparatus that outputs image data and (b) image characteristics related information obtained when the image data is obtained by image-capturing an object; and
   processing the image data to control sharpness representing a three-dimensional appearance of an image, using (a) distance information equivalent to a distance from a focal plane at the time of image-capturing the object and (b) the set image processing condition,
   wherein in the processing, the image data is processed to control the sharpness, by targeting contrast reproduction characteristics of the image data obtained by the image-capturing the object.

13. An image processing method for an image processing apparatus, the method comprising:
   setting an image processing condition for performing image processing, that is set based on (a) output characteristics of an output apparatus that outputs image data and (b) image characteristics related information obtained when the image data is obtained by image-capturing an object; and
   processing the image data to control sharpness representing a three-dimensional appearance of an image, using (a) distance information equivalent to a distance from a focal plane at the time of image-capturing the object and (b) the set image processing condition,
   wherein in the processing, the image data is processed to control the sharpness by targeting contrast reproduction characteristics of the image data obtained by the image-capturing the object.

14. The method according to claim 13, wherein the image characteristics related information is information for calculating or specifying the contrast reproduction characteristics, and is an image capturing condition of an image capturing apparatus used to obtain the image data.

15. The method according to claim 14, wherein the contrast reproduction characteristics are represented by spatial frequency characteristics of an MTF (Modulation Transfer Function).

16. The method according to claim 14, wherein the image capturing condition is at least one of an image capturing apparatus type, a lens type, and an aperture value at the time of shooting.

17. The method according to claim 13, wherein in the image processing, at least one of (1) a defocus amount corresponding to each pixel of the image data, (2) a distance from the focal plane to the object, or (3) a parallax amount is used as the distance information.

18. The method according to claim 13, wherein in the image processing, the image data is processed so that the sharpness degrades as the distance information is larger.

19. The method according to claim 13, wherein in the image processing, the image data is processed so that a contrast of the image data in an acceptable in-focus area including an in-focus area at the time of image-capturing the object increases.

20. The method according to claim 13, wherein in the setting:
    MTF characteristics are calculated as the output characteristics based on information obtained from a sample image; and
    the image processing condition is derived based on the calculated MTF characteristics.

21. The method according to claim 13, wherein the image characteristics related information is the contrast reproduction characteristics of the image data.

* * * * *